United States Patent
Tan et al.

(10) Patent No.: US 12,147,574 B2
(45) Date of Patent: Nov. 19, 2024

(54) ANONYMIZING CALLER IDENTITY BASED ON VOICE PRINT MATCH

(71) Applicant: MOTOROLA SOLUTIONS, INC., Chicago, IL (US)

(72) Inventors: Chun Meng Tan, Penang (MY); Anoop Sehgal Paras Ram, Perak (MY); Daniela Stankovska, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 296 days.

(21) Appl. No.: 17/818,884

(22) Filed: Aug. 10, 2022

(65) Prior Publication Data
US 2024/0054246 A1 Feb. 15, 2024

(51) Int. Cl.
| | | |
|---|---|---|
| G06F 7/04 | (2006.01) | |
| G06F 21/62 | (2013.01) | |
| G06T 5/77 | (2024.01) | |
| G06V 20/52 | (2022.01) | |
| G06V 40/16 | (2022.01) | |
| G10L 17/04 | (2013.01) | |
| G10L 17/06 | (2013.01) | |
| H04N 7/16 | (2011.01) | |

(52) U.S. Cl.
CPC ............ *G06F 21/6254* (2013.01); *G06T 5/77* (2024.01); *G06V 20/52* (2022.01); *G06V 40/171* (2022.01); *G10L 17/04* (2013.01); *G10L 17/06* (2013.01); *G06T 2207/30201* (2013.01); *G06T 2207/30232* (2013.01)

(58) Field of Classification Search
CPC ..... G06F 21/3254; G10L 17/04; G10L 17/06; G06V 20/52; G06V 40/171; G06T 5/005

USPC .......................................................... 726/28
See application file for complete search history.

(56) References Cited

U.S. PATENT DOCUMENTS

| | | |
|---|---|---|
| 7,913,167 B2 | 3/2011 | Cottrille |
| 9,721,107 B2 | 8/2017 | Han et al. |
| 10,210,869 B1 | 2/2019 | King et al. |
| 10,580,272 B1 | 3/2020 | Edwards et al. |
| 10,819,904 B2 | 10/2020 | Jang |
| 11,010,300 B2 | 5/2021 | Watkins et al. |

(Continued)

OTHER PUBLICATIONS

International Search Report and Written Opinion for Application No. PCT/US2023/070576, dated Oct. 23, 2023 (14 pages).

*Primary Examiner* — Jeffrey C Pwu
*Assistant Examiner* — Samuel Ambaye
(74) *Attorney, Agent, or Firm* — Michael Best & Friedrich LLP

(57) ABSTRACT

Methods and systems for anonymizing an identity of a caller using a voice print match. One system includes a surveillance system including a camera and a microphone; and a dispatch computer. The dispatch computer is configured to receive a voice call from the caller, generate a voice print from the voice call, compare the voice print to a plurality of stored voice prints, and, in response to the voice print not matching any of the plurality of stored voice prints, transmit the voice print to the surveillance system. The surveillance system is configured to receive the voice print, capture audio data via the microphone, compare the audio data to the voice print, and, in response to identifying a match between the voice print and the audio data, tag image data, captured via the camera, corresponding to the audio data for redaction.

20 Claims, 7 Drawing Sheets

(56) References Cited

U.S. PATENT DOCUMENTS

| | | |
|---|---|---|
| 11,115,627 B1 | 9/2021 | Drako et al. |
| 2014/0136194 A1* | 5/2014 | Warford .................. G10L 25/51 |
| | | 704/233 |
| 2014/0254778 A1 | 9/2014 | Zeppenfeld et al. |
| 2017/0124834 A1* | 5/2017 | Pedersoli .............. H04L 65/613 |
| 2019/0377901 A1 | 12/2019 | Balzer et al. |
| 2020/0143838 A1* | 5/2020 | Peleg ................... G06V 10/255 |
| 2021/0004486 A1 | 1/2021 | Adams et al. |

* cited by examiner

100

| Voice Print | License Plate | Workplace |
|---|---|---|
| ∿∿∿ | NY ABC123 | 123 Main Street, New City NY 98765 |
| 102 | 104 | 106 |

| Voice Print | School |
|---|---|
| ∿∿∿ | St. Anne High School, 2017 |
| 112 | 114 |

FIG. 4

ANONYMIZING CALLER IDENTITY BASED ON VOICE PRINT MATCH

BACKGROUND OF THE INVENTION

During a public safety event, law enforcement, emergency services, and other organizations may receive information from various sources. These sources may include one or more surveillance systems, such as, for example, drones, closed-circuit television (CCTV), intelligent video analytic (IAV) systems, body-worn cameras (BWCs), smart telephones, or the like. Organizations may also receive information from a voice call received at an answering point for an emergency or non-emergency call center, such as, for example, 911 calls or tip-line calls. A caller providing information regarding a public safety event may desire to remain anonymous. However, even if the caller provides limited identifying information during the voice call, in some situations, the caller may appear on related image data collected regarding the event, which may disclose the caller's identity.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 3 and FIG. 4 each illustrate example caller attributes stored in a caller database included in the system of FIG. 1 according to some embodiments.

Figure 1:
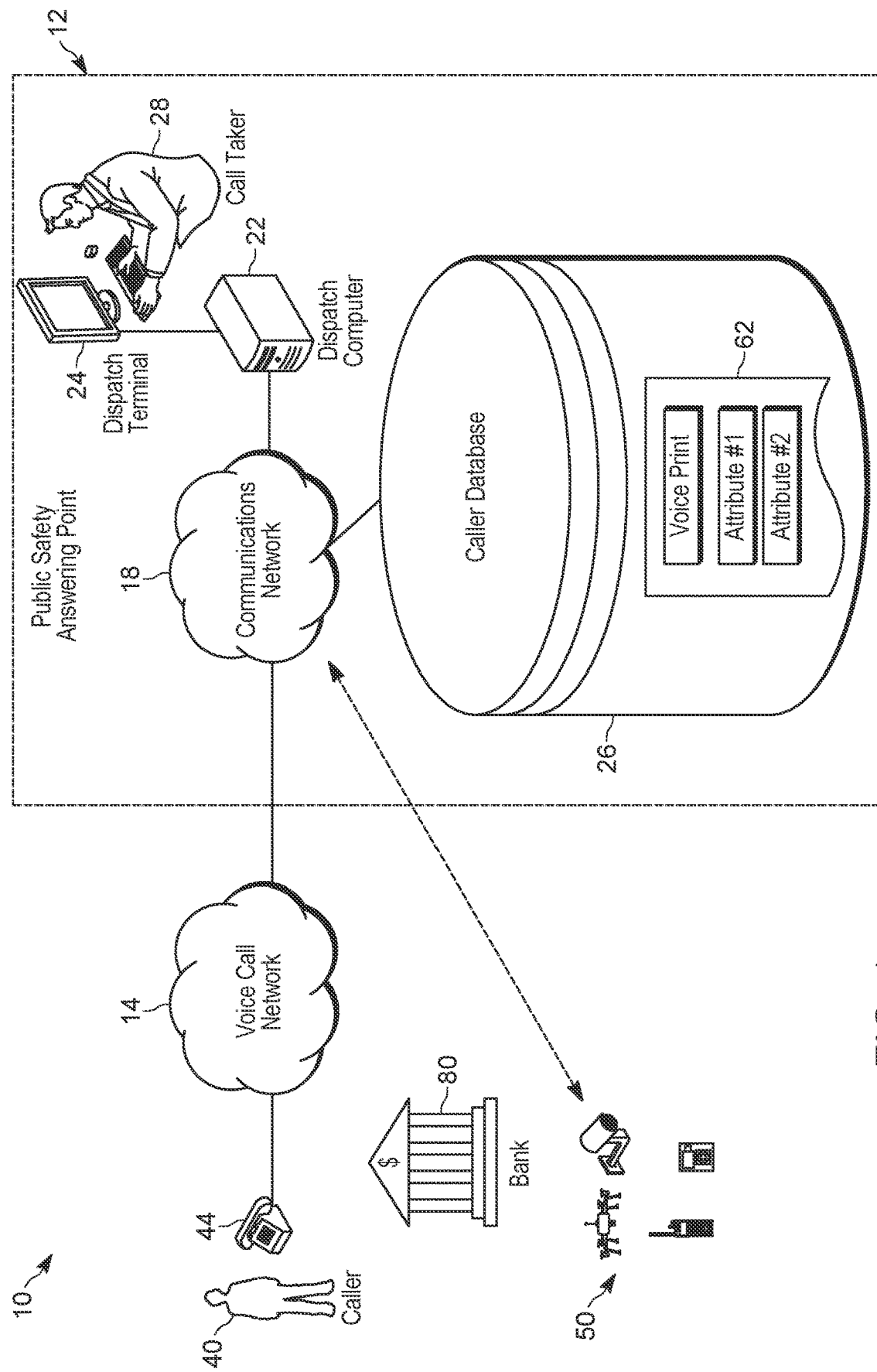
FIG. 1 is a block diagram of a system for anonymizing an identity of a caller according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, a caller providing information in a voice call regarding an event, such as, for example, a public safety event, may desire to remain anonymous to prevent their identity from being disclosed in relation to the event. The caller (or objects associated with the caller, such as a vehicle, a residence, or the like), however, may be captured in image data collected regarding the event via one or more surveillance systems. For example, if a caller calls 911 when witnessing a robbery at a bank, image data collected by one or more surveillance systems located around the bank may capture image data of the caller. Accordingly, even when a caller desires to remain anonymous with respect to an event, image data captured relating to the event may risk disclosure of the caller's identity.

Accordingly, embodiments described herein provide methods and systems for anonymizing a caller to protect the caller's identity across various information sources or assets. Some embodiments anonymize a caller's identity using a voice print of the caller. For example, a unique voice print may be generated for the caller based on the voice call. This voice print may be transmitted to one or more surveillance systems. The one or more surveillance systems compare audio data captured via a microphone of the surveillance system to the received voice print and, in response to determining a match between the voice print and the audio data, tag image data captured via a camera of the surveillance system for redaction. The redaction may occur immediately after the tagging, such as for example at the surveillance system as part of storing or transmitting image data, or at a later time by the surveillance system or a separate device.

For example, some embodiments provide a system for anonymizing an identity of a caller. The system includes a surveillance system including a camera and a microphone, and a dispatch computer. The dispatch computer is configured to receive a voice call from the caller, generate a voice print from the voice call, compare the voice print to a plurality of stored voice prints, and, in response to the voice print not matching any of the plurality of stored voice prints, transmit the voice print to the surveillance system. The surveillance system is configured to receive the voice print, capture audio data via the microphone, compare the audio data to the voice print, and, in response to identifying a match between the voice print and the audio data, tag image data, captured via the camera, corresponding to the audio data for redaction.

Another embodiment provides a surveillance system for anonymizing an identity of a caller placing a voice call received by dispatch computer. The surveillance system includes a microphone capturing audio data, a camera capturing image data corresponding to the audio data, and a controller. The controller configured to receive a voice print generated for the caller from the voice call, compare the audio data to the voice print, and, in response to identifying a match between the voice print generated for the caller from the voice call and the audio data, tag the image data for redaction.

A further embodiment provides a method for anonymizing an identity of a caller. The method includes receiving, with a dispatch computer, a voice call from the caller, generating, with the dispatch computer, a voice print for the caller from the voice call, and comparing the voice print to a plurality of stored voice prints. The method also includes, in response to the voice print not matching any of the plurality of stored voice prints, transmitting the voice print to a surveillance system for comparison to audio data collected via a microphone of the surveillance system, wherein, in response to identifying a match between the voice print and the audio data, image data captured via a camera of the surveillance system is tagged for redaction.

FIG. 1 schematically illustrates a system 10 for anonymizing the identity of a caller associated with a voice call according to some embodiments. The system includes an answering point 12 and a voice call network 14. The answering point 12 includes a communications network 18, a dispatch computer 22, a dispatch terminal 24, and a caller database 26. For ease of description, the system 10 illustrated in FIG. 1 includes a single answering point 12 and a single voice call network 14. Other embodiments may include more than one answering point 12, more than one voice call network 14, or a combination thereof. Similarly, some embodiments may include an answering point 12 with more than one communications network 18, more than one dispatch computer 22, more than one dispatch terminal 24, more than one caller database 26, or a combination thereof.

The voice call may provide information regarding an event, which may, in some embodiments, be a public safety event. For example, in some embodiments, the answering point 12 is a 911 answering point. However, in other embodiments, the answering point 12 is a different emergency answering point or a non-emergency answering point, such as a tip-line answering point.

A dispatcher or call taker 28 interacts with the dispatch terminal 24 to answer communications at the answering point 12 and access and modify data stored in the caller database 26. Within a 911 or other emergency system, the answering point 12 may perform computer aided dispatch (CAD) operations for law enforcement and other public safety or emergency services. CAD operations are known, and, therefore, for ease of description, they will not be described in detail. In some alternative embodiments, the answering point 12 is configured to perform computerized customer service and call center operations and, thus, may receive and process a voice call as described herein without interaction with a call taker 28.

Communications received at the answering point 12 include voice calls received over the voice call network 14. The voice call network 14 may include a cellular network, a telephone network, or both. The telephone network may include the public switched telephone network (PSTN), one or more voice over IP (VoIP) telephone networks, or a combination thereof. Also, in some embodiments, as an alternative to or in addition to receiving calls over a telephone network or a cellular network, the answering point 12 receives other types of voice communications, including, for example, two-way radio communications and citizens band (CB) radio communications. Accordingly, in some embodiments, the answering point 12 communicates with communication networks in addition to the telephone network or the cellular network, such as, for example, a two-way radio communication network, a CB communication network, the Internet, or other private or public networks.

The communications network 18 electrically interconnects the dispatch computer 22, the caller database 26, and other electronic components (not shown) included in the answering point 12. The communications network 18 also connects the answering point 12 to the voice call network 14. Furthermore, in some embodiments, the communications network 18 connects the answering point 12 to another answering point. The communications network 18 may be implemented using wired communication components, wireless communication components, or a combination thereof and may include various types of networks or interconnections, such as, for example, a cellular network, a land mobile radio network, a trunked radio network, a wide area network (such as, for example, the Internet), a local area network (such as, for example, a Wi-Fi® network), a short-range wireless network or connection, or a combination of the foregoing. The communications network 18 passes voice and data traffic to, from, and within the answering point 12 using suitable network protocols and network equipment. The communications network 18 may also originate and terminate voice calls over the voice call network 14.

In some embodiments, the dispatch computer 22 includes one or more computers, terminals, tablets, servers, or a combination thereof, and the functionality described herein as being performed via the dispatch computer 22 may be performed by one device or distributed among multiple devices, including one or more servers configured to provide hosted or cloud services. The dispatch computer 22 is illustrated in FIG. 1 as a single device for sake of brevity. However, in embodiments where multiple devices are used to provide the functionality described herein as being provided by the dispatch computer 22, the other devices are similarly structured and operate similar to the dispatch computer 22 illustrated and described herein.

Figure 2:
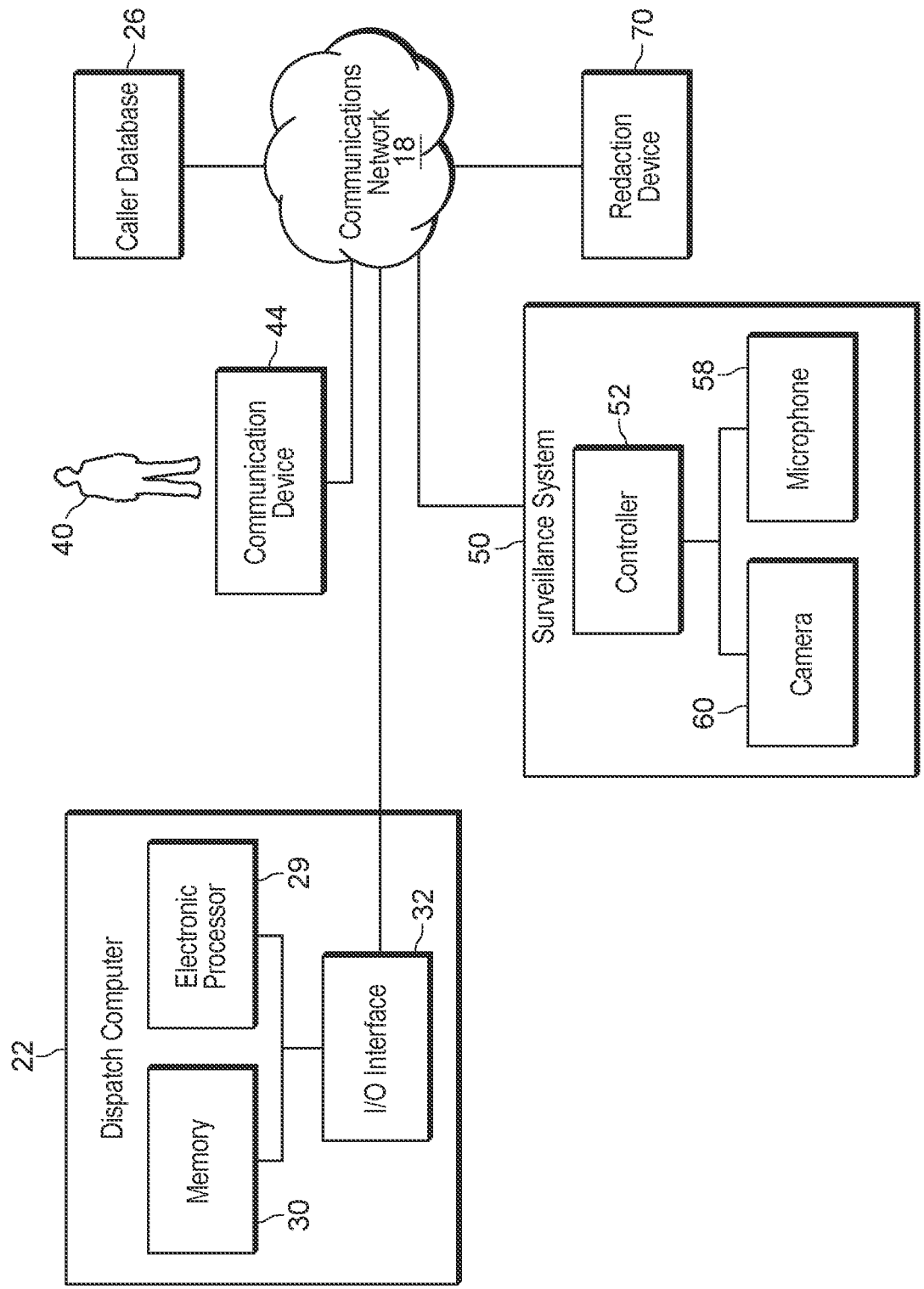
FIG. 2 is a block diagram of a dispatch computer and a surveillance system included in the system of FIG. 1 according to some embodiments.

The dispatch computer 22 includes a plurality of electrical and electronic components that provide power, operational control, and protection to the components and modules within the dispatch computer 22. For example, as illustrated in FIG. 2, in some embodiments, the dispatch computer 22 includes an electronic processor 29 (for example, an electronic microprocessor, microcontroller, or similar device), a memory 30 (for example, non-transitory, computer-readable memory), and an input/output (I/O) interface 32. The components of the dispatch computer 22 may be connected in various ways including, for example, a local bus. The dispatch computer 22 may include additional or alternative components, including additional electronic processors and memory, or application specific integrated circuits (ASICs), as well as one or more input devices, output devices, or a combination thereof.

The electronic processor 29 is communicatively coupled to the memory 30 and executes instructions stored on the memory 30. The electronic processor 29 is configured to retrieve from the memory 30 and execute, among other things, instructions related to the control processes and methods described herein. For example, the memory 30 may include a program storage area and a data storage area. The program storage area stores computer readable instructions ("software"), and may include random access memory (RAM), read only memory (ROM), or another non-transitory computer readable medium. For example, software for anonymizing a caller's identity, as described in below, may be stored in the memory 30 and may be executed by the electronic processor 29. The software may include firmware, one or more applications, program data, filters, rules, one or more program modules, other executable instructions, or a combination thereof and, in some embodiments, the software, when executed, is configured to perform additional functionality than the anonymizing functionality described herein.

The input/output interface 32 is configured to transmit data to and receive data from one or more devices, networks, or systems external to the dispatch computer 22. For example, as illustrated in FIGS. 1 and 2, the dispatch computer 22 (through the input/output interface 32) is configured to communicate with the communications network 18, which allows the dispatch computer 22 to communicate with the caller database 26 and a communication device 44, such as, for example, a telephone, a cellular phone, a smart phone, a computing device, a smart watch or other wearable device, or other electronic device configured to provide audio data to the answering point 12. The communication device 44 is used by a caller 40 to place a voice call to the answering point 12 over the voice call network 14. In some embodiments, the communication device 44 may be mobile or non-mobile.

As also illustrated in FIGS. 1 and 2, the dispatch computer 22 (through the input/output interface 32) is configured to communicate with a surveillance system 50. The surveillance system 50 may include one or more edge policing assets, such as, for example, a drone, closed-circuit television (CCTV), a body-worn camera (BCW), a smart phone carried by an officer, or other systems configured to capture audio and image data. The surveillance system 50 may be associated with a public safety organization or may be associated with a separate individual or entity, such as, for example, a surveillance system used by homeowners at a residence, a surveillance system used by a bank or store, and the like. Also, as used herein, the term "image data" includes both still image data and video data.

As illustrated in FIG. 2, the surveillance system 50 includes a controller 52, a microphone 58, and a camera 60. In some embodiments, the controller 52 includes similar components as described above with respect to the dispatch computer 22, such as, for example, an electronic processor, a memory, and an I/O interface. In some embodiments, the controller 52 includes a digital signal processor, a graphics processing unit, or similar device or circuit for processing image data and audio data. In some embodiments, separate controllers 52 may be used for processing audio data and image data. In other embodiments, a single controller 52 may be configured to process both types of data. As described in more detail below, the surveillance system 50 receives data, such as, for example, a voice print, one or more caller attributes, or a combination thereof from the dispatch computer 22. In some embodiments, the surveillance system 50 also communicates through the communications network 18 with the caller database 26, such as, for example, to store captured caller attributes to a record 62 stored in the caller database 26. Alternatively or in addition, the dispatch computer 22 may store collected caller attributes received from the surveillance system 50 or other sources to the caller database 26.

A surveillance system 50 may include a single device for capturing both audio data and image data or may include multiple devices. For example, in some embodiments, the surveillance system 50 include one device including the camera 60 and another device (included in a separate housing) including the microphone 58, wherein the two components operate together to form the surveillance system 50. The surveillance system 50 may include fewer or additional components than those illustrated in FIG. 2. For example, in some embodiments, the surveillance system 50 only includes the camera 60 but not the microphone 58 or vice versa. Also, in some embodiments, the surveillance system 50 includes multiple cameras, multiple microphones, or a combination thereof. The camera 60 included in the surveillance system 50 is configured to capture image data, which may include still image data, video image data, or a combination thereof.

As illustrated in FIG. 2, in some embodiments, the surveillance system 50 communicates, such as, for example, through the communications network 18, with a redaction device 70. The redaction device 70 may include similar components (not shown) as the dispatch computer 22 and may be configured to redact one or more objects of interest in image data. For example, the redaction device 70 may be configured to identify an object representing a person in an image and redact the person, such as by blurring a person's face, applying a mask or other annotation to the image data to cover the person or a portion thereof, remove the person from the image data, replace the person with an avatar, or the like. Similarly, the redaction device 70 may be configured to identify other objects of interest, such as, for example, vehicles, license plates, street signs, address markers, signs, or the like and redact at least a portion of such identified objects. In some embodiments, the redaction device 70 is configured to redact one or more portions of image data based on received physical attributes, such as, for example, facial attributes of a person, a description of a vehicle (for example, make, model, color, size, type, or the like), a license plate number, a name, a number (for example, an address number), or the like. In particular, the redaction device 70 may be configured to apply received attributes to image data to identify particular objects of interest in the image data and redact at least a portion of any identified objects of interest. In some embodiments, the redaction device 70 may be part of an image storage or processing device or system and, for example, may be implemented by one or more servers receiving image data from one or more sources for processing (image analytics), storage, or both. The functionality performed by the redaction device 70, or portions thereof, may also be performed by the surveillance system 50 to redact image data at the surveillance system 50, such as, for example, prior to any processing, transmission, or long-term storage. Also, in some embodiments, the redaction device 70, the surveillance system 50, or a separate device is configured to modify captured audio data, such as, for example, to disguise a user's voice or remove portions of the audio data including identifying information of the caller 40.

Although FIG. 2 illustrates one communication device 44 and one surveillance system 50, this configuration is provided as one example embodiment and the dispatch computer 22 may communicate with any number of communication devices 44 (including the same type of device or different types of devices), any number of surveillance systems 50 (including the same type of surveillance system or different types of surveillance systems), or a combination thereof. Also, the dispatch computer 22 may communicate with the communication device 44, the surveillance system 50, or both through one or more intermediary devices (not shown). Furthermore, in some embodiments, the dispatch computer 22 may communicate with different devices through different types of communication networks.

Returning to FIG. 1, the dispatch computer 22 is communicatively coupled to the dispatch terminal 24, such as for example, through a dedicated wired or wireless connection or through the communications network 18. The dispatch terminal 24 may include similar components (not shown) as the dispatch computer 22 and may also include one or more input devices, output devices, or input-and-output devices including, for example, one or more displays, keyboards, keypads, mice, joysticks, touchscreens, speakers, microphones, and headsets, which allow the caller taker 28 to interact with the dispatch terminal 24. The dispatch computer 22 receives input from and provides output to the call taker 28 through the dispatch terminal 24. The dispatch computer 22 and the dispatch terminal 24 are capable of originating and terminating voice calls, either alone, or by interfacing with network equipment (not shown) in the communications network 18.

The call taker 28 may be a dispatcher trained to handle voice calls. For example, within a 911 or other emergency call system, the call taker 28 may be a public safety dispatcher trained to handle emergency communications received over the voice call network 14. Based on a received voice call, the call taker 28 may use the dispatch terminal 24 to manually dispatch the appropriate services to handle an event reported by a caller. Alternatively or in addition, the dispatch computer 22 may be configured to automatically dispatch appropriate services. The dispatch computer 22 and the dispatch terminal 24 may also receive data input by the call taker 28 or automatically generated based on the voice call, which may be saved, in some embodiments, to the caller database 26.

For example, the dispatch computer 22 may be configured to read and write caller information to and from the caller database 26. In the illustrated embodiment, the caller database 26 is a database housed on a suitable database server (not shown) and accessible by the dispatch computer 22 over the communications network 18. In alternative embodiments, the caller database 26 may be located on a computer external to the answering point 12 and accessible by the dispatch computer 22 over one or more networks.

The caller database 26 stores information regarding callers contacting the answering point 12. The information may be stored in one or more caller records 62, wherein each record 62 includes a (unique) voice print of a caller 40 generated from a voice call received at the answering point 12 and, optionally, one or more attributes of the caller. FIGS. 3 and 4 each illustrate example attributes of a caller included in a caller record. For example, FIG. 3 illustrates an example caller record 100 stored in the caller database 26, wherein the caller record 100 includes a voice print 102 (as a unique key for the record 100), a license plate attribute 104 (NY ABC123), and a workplace attribute 106 (123 Main Street, New City, CA 98765) of a caller. FIG. 4 illustrates another example caller record 110 stored in the caller database 26, wherein the caller record 110 includes a unique voice print 112 of the caller and a school attribute 114 (St. Anne High School, 2017) of a caller. In some embodiments, one or more of the attributes included in a caller record may be associated with a time stamp, which may represent a storage time of the attribute, such as, for example, when the attribute was added to the caller record. The time stamp may be specified as a date, a time, or a combination thereof and may be used to determine an "age" of a stored attribute. As described in more detail below, the age of an attribute may be used to determine whether a stored attribute is usable or is expired and, thus, should not be used. The example caller records 100 and 110 are provided for illustrative purposes, and the records stored in the caller database 26 may have a different form and may include different numbers or types of attributes, wherein the types of attributes included in each record may vary based on what information has been collected for a particular caller.

As illustrated in FIG. 1, the caller 40 may place a voice call to the answering point 12 using the communication device 44, such as a telephone connected to the voice call network 14. For example, as an example within a 911 system, the caller 40 may use the communication device 44 to report, as one possible use case, a robbery witnessed by the caller 40 at a bank 80. The communication device 44 initiates the voice call, which is routed through the voice call network 14 to the answering point 12.

The voice call is received by the dispatch computer 22 (through the voice call network 14 and the communications network 18) and may be routed to the dispatch terminal 24, where the call taker 28 answers the voice call and interacts with the caller 40.

As noted above, in some embodiments, the caller 40 desires to remain anonymous. However, even if the caller 40 does not provide his or her name during the voice call, the caller 40 may be captured in image data collected by one or more surveillance systems 50, such as one or more surveillance systems 50 positioned in an area associated with a reported event.

Accordingly, to solve this and other technical issues, the dispatch computer 22 is configured to anonymize the identity of the caller 40 by using the voice call and a voice print of the caller to trigger redaction of the caller 40 from image data collected by one or more surveillance systems 50.

Figure 5A:
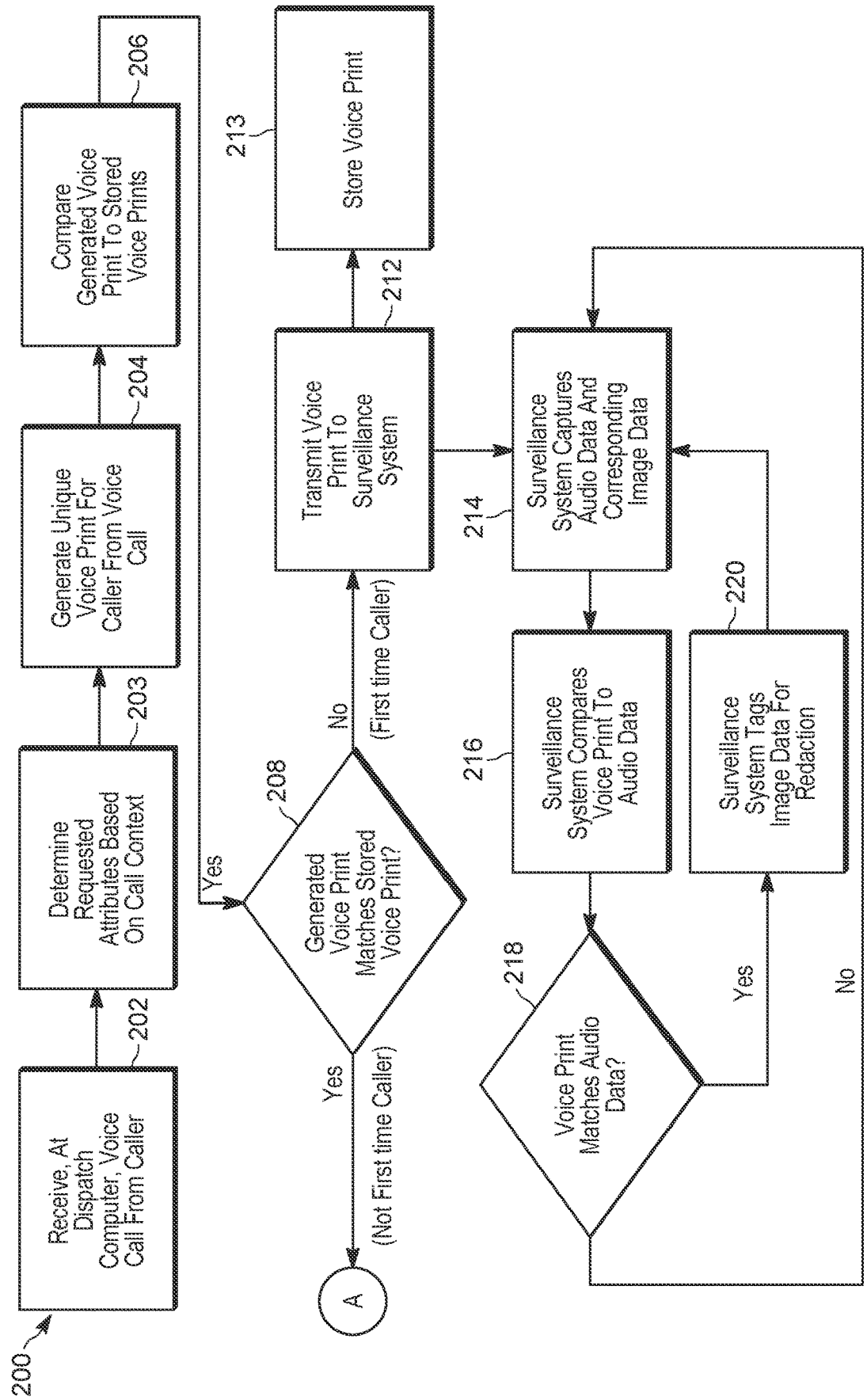
FIGS. 5A and 5B illustrate a flowchart of a method of anonymizing an identity of a caller using the system of FIG. 1 in accordance with some embodiments.
Figure 5B:
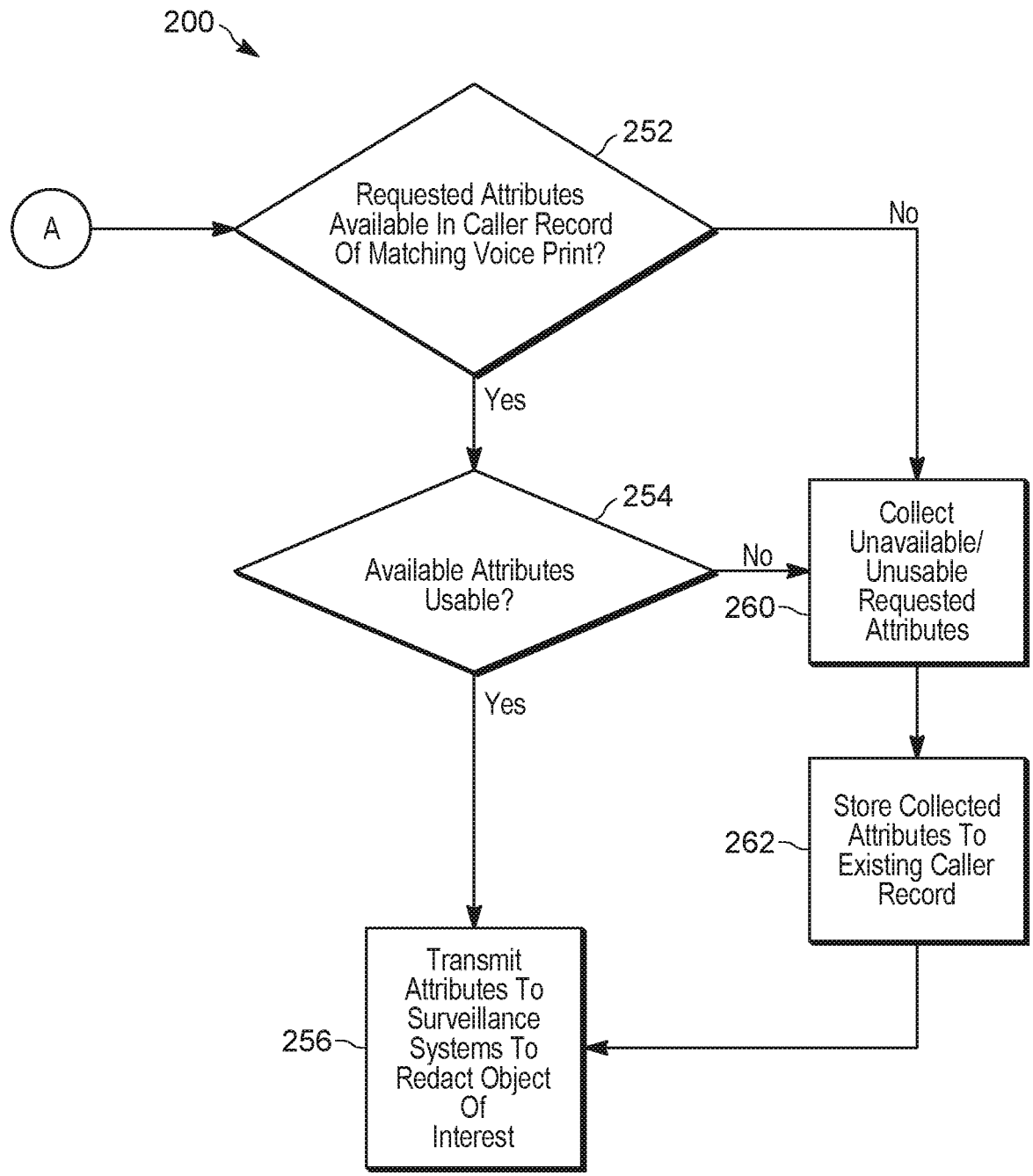

For example, FIGS. 5A and 5B illustrate a method 200 for anonymizing an identity of a caller according to some embodiments. The method 200 is described as being performed by the dispatch computer 22 and the surveillance system 50 and, in particular, electronic processors or controllers included in such components. However, it should be the functionality described herein as part of the method 200 may be distributed among one or more devices in various configurations. For example, in some embodiments, the surveillance system 50 is configured to perform portions of the method 200 described herein as being performed by the dispatch computer 22 or vice versa. As one example, in some embodiments, the dispatch computer 22 is configured to access stored image data and perform redaction as described herein without interfacing with the surveillance system 50. Also, in some embodiments, additional devices, or systems, such as for example, the redaction device 70, may be used to perform the method 200 or portions thereof.

As illustrated in FIG. 5A, the method 200 includes receiving, at the dispatch computer 22, a voice call from the caller 40 (at block 202). The method 200 also includes determining a list of one or more requested attributes for the caller based on a context of the voice call (at block 203). These requested attributes may represent attributes usable to anonymize the identity of the caller 40, address the reported event, or a combination thereof. For example, when the voice call includes information about the caller 40 witnessing the event or others at the event seeing or interacting with the caller 40, the requested attributes may include physical attributes of the caller, such as facial attributes, age, height, hair color, clothes, or the like. Similarly, when the voice call includes information about the caller 40 being at home, at work, at school, or at another location, the requested attributes may include one or more addresses or school or workplace names. Also, when the voice call includes information about the caller 40 driving, the requested attributes may include one or more physical attributes of a vehicle owned or operated by the caller 40, such as, for example, a license plate, a make, a model, a year, a color, a vehicle type, or the like. The dispatch computer 22 may apply various rules or logic to identify the relevant requested attributes, such as, for example, by identifying a type of the event being reported, keywords included in the voice call ("witness," "saw," "driving," "work," "home," "school," "neighborhood," or the like), or a combination thereof. For example, in some embodiments, the dispatch computer 22 may be configured to apply one or more rules to identify a context of the voice call, such as for example, context of the caller or the reported event, wherein the rules may be manually defined by a dispatcher or administrator or may be automatically learned, such as, for example, via one or more machine learning processes.

As illustrated in FIG. 5A, the dispatch computer 22 generates a voice print for the caller from the voice call (at block 204), which may be unique for the caller. The dispatch computer 22 may generate the voice print from a recording of the voice call or from streaming audio data of the voice call. In some embodiments, the dispatch computer 22 generates the voice print by providing the voice call or a portion thereof to a separate device configured to generate a voice print. The voice print may be generated using a spectrum analyzer, a spectrum analyzer algorithm, or the like and may be represented as a spectrum of frequencies and relative intensities. In some embodiments, the dispatch computer uses a stored voice print of the call taker 28, which the dispatch computer 22 uses to filter out the voice of the call taker 28 in the voice call and identify the voice of the caller 40, wherein the identified voice of the caller 40 within the voice call is used to generate the unique voice print of the caller 40.

The dispatch computer 22 compares the generated voice print of the caller 40 to voice prints stored in caller database 26 to determine whether the caller 40 is a first-time caller (at block 206). In particular, the dispatch computer 22 compares the generated voice print of the caller 40 to determine whether the generated voice print matches a voice print stored in a record 62 within the caller database 26. In response to identifying a match to a stored voice print (at block 208), the caller 40 is identified as not being a first-time caller but, rather, being a repeat caller. Alternatively, in response to not identifying a match to a stored voice print (at block 208), the caller 40 is identified as being a first-time caller. It should be understood that a "match" to a stored voice print may include an exact match or a match within a predetermined threshold or confidence level, which allows for some discrepancies between the generated voice print and the stored voice prints that accounts for background noise, voice call quality, and variations in other characteristics the caller 40, the communication device 44, the voice call network 14, or a combination thereof, that may vary between when the voice print is generated from the call and when a potential stored voice print was generated.

As illustrated in FIG. 5A, in response to determining that the caller 40 is a first-time caller (see "NO" branch from block 208 indicating no stored voice prints match the generated voice print), the dispatch computer 22 transmits the generated voice print of the caller 40 to one or more surveillance systems 50 (at block 212). In some embodiments, the dispatch computer 22 determines the one or more surveillance systems 50 to transmit the voice print to based on, for example, a context of the voice call, the caller, an event associated with the voice call, or a combination thereof. For example, the dispatch computer 22 may transmit the voice print to a surveillance system 50 located around a location of the reported event, a residence or workplace of the caller 40, or the like. The dispatch computer 22 may transmit the generated voice print of the caller 40 to a surveillance system 50 by transmitting the actual generated voice print, transmitting a link for accessing the generated voice print, transmitting other identifying information regarding the generated voice print, or a combination thereof. As also illustrated in FIG. 5A, the dispatch computer 22 may also store the generated voice print in the caller database 26, such as, for example, by creating a new record 62 including the generated voice print (at block 213). In some embodiments, the generated voice print is only stored to the caller database 26 in response to determining one or more attributes of the caller 40, such as, for example, via the voice call with the dispatch computer 22, via a surveillance system 50 receiving the generated voice print, or a combination thereof.

In some embodiments, the dispatch computer 22 generates and transmits a voice print for each first-time caller. However, in other embodiments, the dispatch computer 22 uses the determined list of requested attributes to control whether a voice print is generated, transmitted, or both. For example, based on the context of the call, the requested attributes may not include any physical attributes of the caller 40, which may indicate that it is unlikely that the caller 40 was captured or will be captured in image data associated with the reported event. For example, if the caller 40 is reporting an event that was described to him or her by a third party and was not witnesses or attended by the caller 40, the determined requested attributes may not include any attributes of the caller 40 as it is unlikely that the caller 40 was or will be captured in image data associated with the event and, thus, physical attributes of the caller 40 are likely not useful to protect the caller's identity. In other words, in some embodiments, the dispatch computer 22 is configured to transmit a generated voice print for a first-time caller in response to the determined list of requested attributes including one or more physical appearance attributes of the caller 40 and, in situations where the list of requested attributes does not include physical appearance attributes of the caller 40, the dispatch computer 22 may be configured to collect the requested attributes as described below for unavailable or unusable attributes of repeat callers.

In situations where the dispatch computer 22 transmits a generated voice print to one or more surveillance system 50, each surveillance system uses the received voice print to identify if the caller 40 is likely within a field-of-field of the surveillance system 50. For example, as described above, a surveillance system 50 captures audio data and image data via a camera 60 and a microphone 58. Accordingly, each surveillance system 50 receiving the generated voice print captures audio data and image data (at block 214) and compares the received voice print to captured audio data (at block 216). In response to captured audio data matching the received voice print (at block 218), the surveillance system 50 tags captured image data corresponding to the matching audio data for redaction (at block 220). In other words, audio data captured via the surveillance system 50 that matches the voice print means that the caller 40 is likely within a field-of-view or area of interest of the surveillance system 50 and, thus, the caller 40 should be redacted from image data captured by the surveillance system 50 to anonymize the caller's identity.

In some embodiments, a surveillance system 50 generates a voice print of captured audio data (using a similar voice print technique as applied by the dispatch computer 22 when initially creating the voice print transmitted to the surveillance system 50) and compares the voice print generated from the captured audio data to the received voice print to determine whether there is a match. Alternatively or in addition, a surveillance system 50 may compare one or more characteristics of the captured audio data to the received voice print to determine whether there is match. Again, as noted above, a voice print may "match" captured audio data when the voice print matches the captured audio data exactly or within a predetermined threshold or confidence level.

As used in the present application, tagged image data "corresponding" to audio data matching the voice print may include image data captured at the same time as the audio data matching the voice print and, optionally, image data captured a predetermined time before the matching audio data, a predetermined time after the matching audio data, or a combination thereof. For example, a caller 40 may be captured in image data at times when the caller 40 is not speaking. Accordingly, tagging image data captured a predetermined amount of time before the matching audio data, a predetermined amount of time after the matching audio data, or a combination thereof may allow the caller 40 to be redacted from the image even when the caller 40 is not speaking. Similarly, in some embodiments, the "corresponding" image data may include all image data captured by the surveillance system 50 the same hour, day, or other time span as the matching audio data, wherein the time span may vary based on a context of the voice call, such as for example, based on a type of event associated with the original voice call.

Tagging the image data may include setting a flag or label associated with the image data, storing other data that identifies the image data as being subject to redaction, storing or transmitting the image data to a particular storage location or system, or a combination thereof. For example, in some embodiments, the surveillance system 50 tags image data for redaction by storing identifying information of the surveillance system 50, the image data, timing information indicating a time span for performing redaction, or a combination thereof. In some embodiments, information regarding the caller or associated voice print is also stored or associated with the tagged data, which allows the tagged image data to be associated with a particular voice print and, consequently, a particular caller 40. The flag, label, or other identifying information may be stored with the image data, the audio data, or separate from the image data and the audio data and may be stored by the surveillance system 50, transmitted to a remote storage or redaction system, such as, for example, the redaction device 70, or a combination thereof. In some embodiments, tagging image data also includes redacting the image data. For example, the surveillance system 50 or a separate device or system, such as, for example, the redaction device 70, may be configured to redact tagged image data. Redacting the tagged image data may include identifying one or more objects in the image data, such as, for example, a person, a vehicle, a license plate, an address marker, a sign, or the like and obscuring each identified object. Obscuring an object may include blurring the object (for example, pixelating a person's face), masking the object (for example, applying a solid shape or other annotation to the image data), removing the object from the image data, replacing the object with an avatar, or the like.

As illustrated in FIG. 5A, the surveillance system 50 may repeatedly check whether captured audio data matches the received voice print and tag corresponding image data accordingly. In some embodiments the surveillance system 50 may repeatedly perform this matching and tagging until instructed (for example, by the dispatch computer 22) to stop or until a predetermined time duration has passed, wherein the predetermined time duration may be a default duration or a duration received from the dispatch computer 22 associated with the voice print.

In some embodiments, the surveillance system 50 or a separate device or system may be configured to use tagged image to determine one or more attributes associated with the caller 40, which may be stored in the caller database 26 with the generated voice print for the caller. For example, the surveillance system 50 or a separate device or system may be configured to apply various facial recognition techniques or other image processing techniques to identify one or more attributes associated with the caller 40. For example, the one or more attributes may include facial features of the caller 40, a hair color, eye color, or other distinguishing features of the caller 40, a make, model, year, color, or type of the caller's vehicle, an address of the caller's residence, workplace, or the like.

As illustrated in FIG. 5B, in response to the generated voice print matching one of the stored voice prints in the caller records (see "YES" branch from block 208 indicating a match to a stored voice print), the dispatch computer 22 determines whether the requested attributes (determined at block 203) are available in the caller record matching the generated voice print (at block 252). In some embodiments, in response to a requested attribute being available in the caller record (at block 252), the dispatch computer 22 determines whether an attribute available in the matching caller record is usable (at block 254). The dispatch computer 22 may determine whether an available attribute is useable by determining a time stamp associated with the stored attribute and determining, based on the time stamp, whether an "age" of the stored attribute (representing how long ago the attribute was determined for the user and stored to the caller record calculated based on the time stamp) satisfies a predetermined age threshold that controls whether the attribute is usable or expired. The predetermined age threshold may depend on the type of the attribute. For example, a vehicle license plate number may be associated an age threshold of 3 years, whereas a workplace address may be associated with an age threshold of 1 year. In some embodiments, different age thresholds are set for different types of attributes, such as, for example, as part of configuring the system 10. In other embodiments, a call taker 28 may be prompted to specify a predetermined age threshold or may be prompted to confirm, before the attributed is transmitted, whether an available attribute is still useful based on a provided age of the attribute. In some embodiments, the dispatch computer 22 may not perform a check for usability of an available attribute or may only perform this check for certain types of attributes. Accordingly, it should be understood that this step is optional.

As illustrated in FIG. 5B, in response to a requested attribute being available in the caller record (at block 252) and passing the optional usability check (at block 254), the dispatch computer 22 may transmit the requested attribute obtained from the matching caller record to one or more surveillance systems 50 (at block 256), wherein each surveillance system 50 uses the received attribute to tag image data for redaction and optionally redact the caller 40 from the image data. For example, when the transmitted attribute includes a physical appearance attribute of the caller 40, the surveillance system 50 may use the received attribute to identify the caller 40 within captured image data, such as by applying one or more facial recognition techniques, and redact the caller 40 from the image data. As another example, in response to the transmitted attributes including a license plate number of a vehicle associated with the caller 40, the surveillance system 50 may use the received plate number to identify a vehicle in captured image data and redact the vehicle or a portion thereof from the image data. As noted above for first-time callers, in some embodiments, the dispatch computer 22 determines the one or more surveillance systems 50 to transmit one or more attributes to based on, for example, a context of the voice call, such as for example, a context of the caller, an event associated with the call, or a combination thereof. In some embodiments, the dispatch computer 22 is also configured to transmit different attributes to different surveillance systems 50 based on, for example, a location of a surveillance system 50.

In some embodiments, in addition to transmitting one or more attributes associated with the caller 40, the dispatch computer 22 also transmits a voice print of the caller 40 to a surveillance system 50, which the surveillance system 50 may use to identify the repeat caller as described above for a first-time caller and tag corresponding image data. For example, in some embodiments, after tagging the image data, a surveillance system 50 may use one or more attributes provided via the dispatch computer 22 to identify an object of interest associated with the caller 40 within the tagged image data and redact the identified object.

In response to an available attribute being unusable (at block 254) or in response to a requested attribute not being available in the matching caller record (at block 252), the dispatch computer 22 may collect an unavailable or updated version of an unusable attribute (at block 260), store the collected attribute to the identified matching caller record (at block 262), and transmit the collected attribute to one or more surveillance systems 50 (at block 256). In some embodiments, the dispatch computer 22 collects an unavailable or unusable attribute by prompting the call taker 28 (via one or more user interfaces presented to the call taker 28 via the dispatch terminal 24) to request the attribute from the caller 40 during the voice call. Alternatively or in addition, the dispatch computer 22, when applying automated call processing, may request the attribute directly from the caller 40, such as, for example, by verbally requesting the attribute from the caller 40 via a chat bot or other automated tool or service. In some embodiments, as only unavailable or unusable attributes that were included in the list of requested attributes are collected, requests made to the caller 40 for information are limited, which results in efficient use of the voice call, which may be limited in time or limited by the caller's willingness to provide information.

In some embodiments, in addition to or as an alternative to requesting an attribute from the caller 40, an unavailable or unusable attribute is collected via a separate device or system. For example, in some embodiments, one or more attributes may be collected via image data captured by one or more surveillance systems 50. As described above, a surveillance system 50 may use a voice print of the caller 40 to identify one or more objects associated with the caller 40 in captured image data and use the captured image data to collect physical appearance attributes of the object, such as performing facial recognition techniques. For example, in some embodiments, the dispatch computer 22 dispatches personnel to a location of the caller 40, wherein the personnel is associated with a surveillance system 50 that may be used to capture attributes associated with the caller 40, such as, for example, physical appearance attributes of the caller 40 via one or more facial recognition techniques applied to captured image data of the caller 40. As described above, the generated voice print of the caller 40 may be used to verify the caller's identity to ensure that attributes are captured from the appropriate individual. In embodiments where the voice call is part of a video call, the dispatch computer 22 may be configured to collect physical appearance attributes of the caller 40 using the image data associated with the video call, which may eliminate the need to dispatch personnel to the caller's location.

Collected attributes stored to the call record for the caller 40 allow the system 10 to anonymize the caller's identity efficiently and effectively in image data associated with subsequent voice calls or for other reasons or purposes. For example, stored attributes may be used to locate or identify a caller 40 in captured image data, verify an identify of a caller 40, or the like. As described above, time stamp information may be associated with stored attributes, which allow a usability of attributes to be determined and avoid using expired data, which may waste computing and organizational resources and may risk disclosure of the caller's identity.

Figure 6:
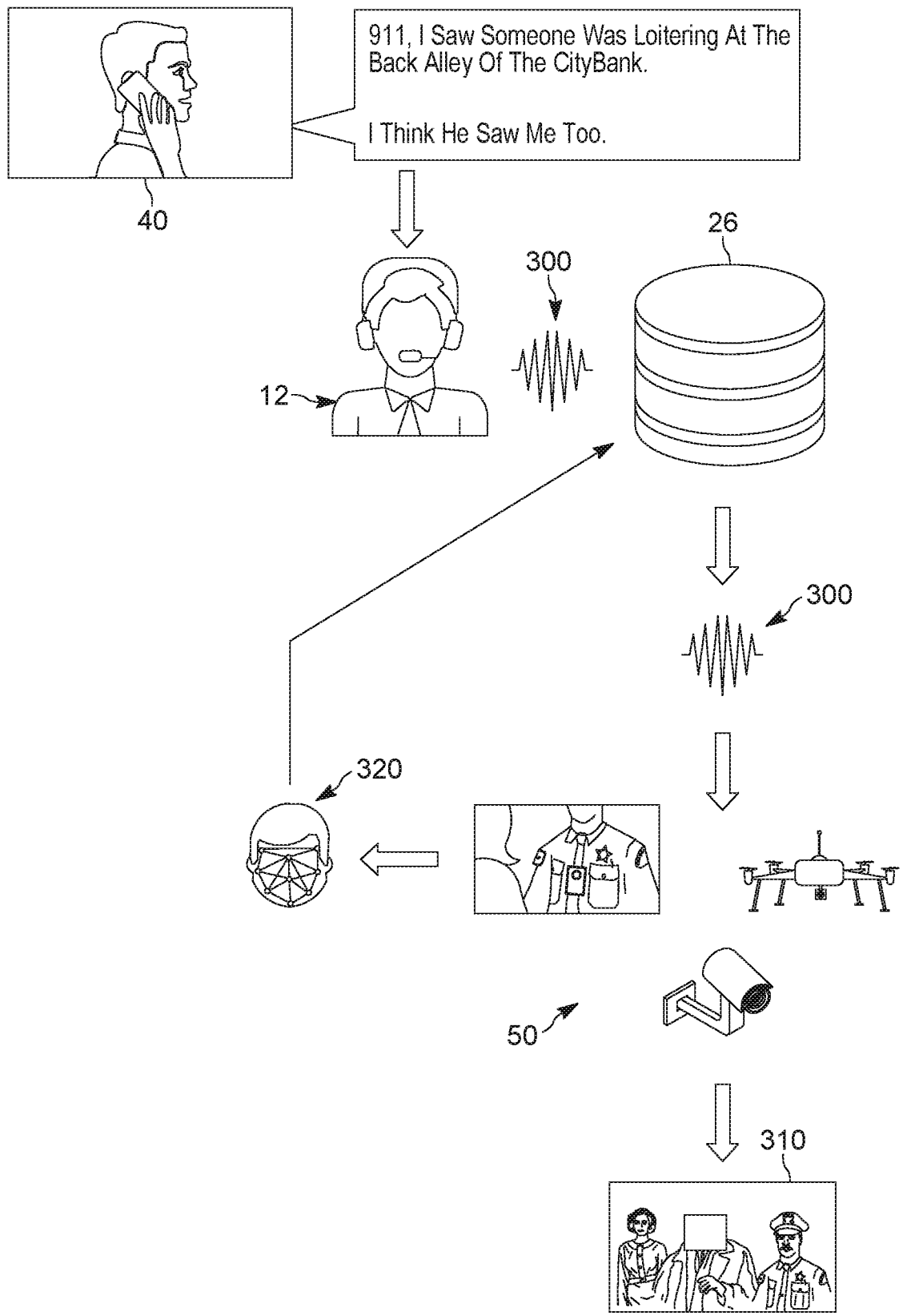
FIG. 6 illustrates an example use case applying the method of FIGS. 5A and 5B for a first-time caller in accordance with some embodiments.

FIG. 6 illustrates an example use case applying the method 200 of FIGS. 5A and 5B for a first-time caller in accordance with some embodiments. As illustrated in FIG. 6, in the example, non-limiting use case, a caller 40 makes a 911 voice call to an answering point 12 to report seeing someone loitering at the back alley of a bank, wherein the caller 40 indicates that the person loitering saw the caller 40. The answering point 12 (the dispatch computer 22) generates a voice print 300 of the caller 40 using the voice call, which is compared to voice prints stored in the caller database 26. In response to no stored voice prints matching the generated voice print 300, the answering point 12 transmits the generated voice print 300 to one or more surveillance systems 50, wherein each surveillance system 50 uses the voice print 300 to identify when an object associated with the caller 40 is likely within a field-of-view of a camera of the surveillance system 50 (by matching the voice print to audio data captured via a microphone of the surveillance system 50) and tag image data captured by the camera accordingly for redaction of the object. For example, as illustrated in FIG. 6, in response to matching captured audio data to the received voice print 300, the caller's face may be redacted in image data 310. As also illustrated in FIG. 6, in some embodiments, in response to matching audio data to the received voice print, one or more attributes 320 of the caller 40 may be collected from the corresponding image data, such as, for example, via one or more facial recognition techniques, which may be stored to a new record in the caller database 26 associated with the generated voice print 300, which allows the attributes to be used to anonymize the caller's identity in subsequent calls.

Figure 7:
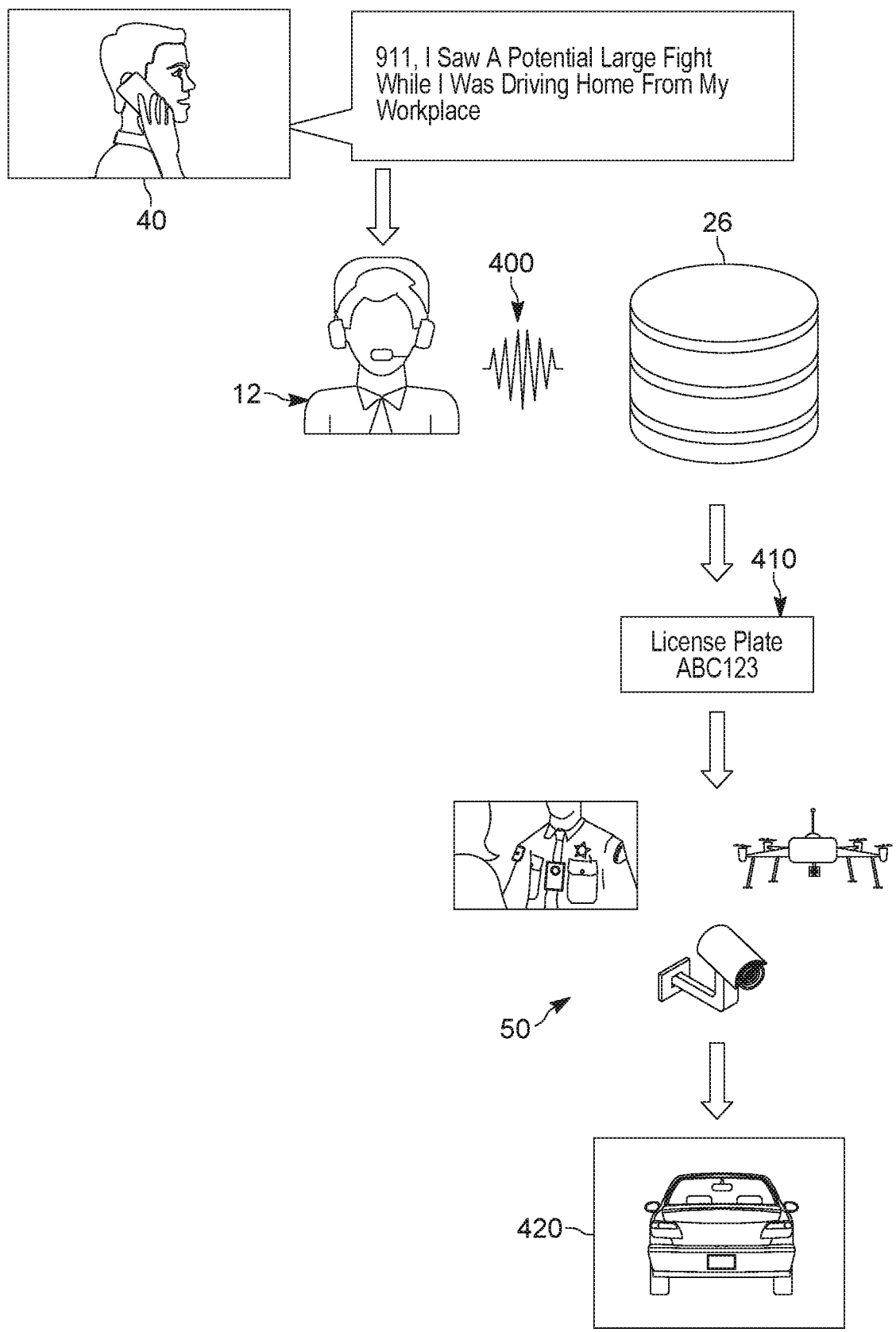
FIG. 7 illustrates an example use case applying the method of FIGS. 5A and 5B for a repeat caller in accordance with some embodiments.

FIG. 7 illustrates an example use case applying the method 200 of FIGS. 5A and 5B for a caller that is a repeat caller in accordance with some embodiments. As illustrated in FIG. 7, in the example, non-limiting use case, a caller 40 makes a 911 voice call to an answering point 12 to report witnessing a fight while driving home from work. The answering point 12 (the dispatch computer 22) generates a voice print of the caller 400 using the voice call, which is compared to voice prints stored in the caller database 26. In response to identifying a matching voice print in the caller database 26, the answering point 12 transmits one or more attributes 410 included in the matching caller record to one or more surveillance systems 50. As described above, the particular attributes transmitted to a surveillance system 50 may include requested attributes determined based on the context of the voice call. For example, the requested attributes for the use case illustrated in FIG. 7 may include vehicle attributes since the caller 40 identified that she was driving. The requested attributes may similarly include a workplace address of the caller 40 since the caller 40 identified that they were driving home from work. As also described above, in some embodiments, the answering point 12 may determine a usability of available attributes before transmitting the attributes to a surveillance system 50 to ensure that transmitted attributes are not expired. For example, although a workplace address attribute may be available for the caller 40, this attribute may not be transmitted to a surveillance system 50 when the age of the address attribute indicates that the attribute may be expired. As illustrated in the example use case of FIG. 7, transmitted attributes are not limited to physical appearance attributes of the caller 40 but may relate to objects of interest associated with the caller 40, such as a vehicle, a residence, a workplace, a location, a sign, or the like.

As illustrated in FIG. 7, a surveillance system 50 receiving an attribute uses the received attribute to tag image data for redaction and optionally redact captured image data to anonymize the caller's identity. For example, as illustrated in FIG. 7, a surveillance system 50 (or a separate system or device, such as the redaction device 70) may redact a license plate in captured image 420 in response to a license plate of a vehicle captured in the image data matching the received attribute of the caller 40.

Accordingly, embodiments described herein use a voice print of a caller placing a voice call to an answering service to anonymize the caller's identity in associated image data. For example, the voice print may be used to identify stored attributes of the caller, which may be used to trigger redaction of an object of interest associated with the caller in image data. Alternatively or in addition, the voice print may be used to identify when a caller is likely within a field-of-view of a surveillance system by comparing the voice print to audio data captured by the surveillance system. Accordingly, the use of the voice print allows the tagging and associated redaction of image data to be efficiently and effectively controlled to mitigate a risk of the caller's identity being disclosed without over-redacting image data, which makes the image data less useful. Furthermore, attributes of a caller collected by a call taker or based on data captured by a surveillance system may be stored with the caller's voice print to allow for subsequent tagging and redaction of image data in the situation the caller makes a subsequent voice call. In addition, the attributes used to tag and redact image data (including the voice print) may be automatically tailored based on a context of the voice call, which limits an amount of information that needs to be collected from the caller or other sources and results in more efficient use of the systems and methods described herein.

Although embodiments and use cases described herein may relate to public safety events and public safety systems, the methods and systems described herein are not limited to such applications or environments and may be used in various applications or environments where voice or audio data triggers tagging or redaction of image data. Furthermore, in some embodiments, the methods and systems described herein may be used regardless of whether a caller is a first-time caller or a repeat caller and, in some embodiments, the methods and systems described here may be used without establishing caller records as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for anonymizing an identity of a caller, the system comprising:
a surveillance system including a camera and a microphone; and
a dispatch computer configured to:
receive a first voice call from the caller,
generate a first voice print from the voice call,
compare the first voice print to a plurality of stored voice prints, and
in response to the first voice print not matching any of the plurality of stored voice prints, transmit the first voice print to the surveillance system, the surveillance system configured to:
receive the first voice print,
capture audio data via the microphone,
compare the audio data to the first voice print, and
in response to identifying a match between the first voice print and the audio data, tag image data, captured via the camera, corresponding to the audio data for redaction,
wherein the dispatch computer is further configured to
receive a second voice call from the caller,
generate a second voice print from the second voice call,
compare the second voice print to the plurality of stored voice prints to determine whether the caller is a first-time caller, and
in response to determining the caller is not a first-time caller, transmit one or more attributes stored with the first voice print to the surveillance system.

2. The system of claim 1, wherein the surveillance system is further configured to redact an object of interest identified in the image data.

3. The system of claim 2, wherein the surveillance system is configured to redact the object of interest identified in the image data by providing the image data to a redaction device, wherein the redaction device redacts the object of interest identified in the image data.

4. The system of claim 1, wherein the dispatch computer is further configured to store the first voice print as one of the plurality of stored voice prints.

5. The system of claim 4, wherein the first voice print is stored with one or more physical attributes determined from the image data.

6. The system of claim 5, wherein the one or more physical attributes include facial features of the caller.

7. The system of claim 1, wherein the dispatch computer is further configured to determine a list of requested attributes of the caller based on a context of the second voice call.

8. The system of claim 7, wherein the dispatch computer is further configured to determine a first attribute of the list of requested attributes based on an attribute of the caller stored with the first voice print.

9. The system of claim 8, wherein the dispatch computer is further configured to verify a usability of the first attribute based on a time stamp associated with the attribute of the caller stored with the first voice print.

10. The system of claim 8, wherein the dispatch computer is further configured to prompt a dispatcher to request a second attribute of the list of requested attributes from the caller.

11. The system of claim 1, wherein the surveillance system is a first surveillance system and wherein the dispatch computer is further configured, in response to determining the caller is not a first-time caller, transmit the one or more attributes to a second surveillance system.

12. The system of claim 1, wherein the surveillance system includes at least one selected from a group consisting of a drone, closed-circuit television, and a body-worn camera.

13. The system of claim 1, wherein the dispatch computer is configured to, in response to the first voice print not matching any of the plurality of stored voice prints, transmit the first voice print to the surveillance system by transmitting the first voice print to each of a plurality of surveillance systems, the plurality of surveillance systems including the surveillance system, wherein the dispatch computer is configured to select the plurality of surveillance systems based on a context of the first voice call.

14. A method for anonymizing an identity of a caller, the method comprising:
receiving, with a dispatch computer, a first voice call from the caller;
generating, with the dispatch computer, a first voice print for the caller from the first voice call;
comparing the first voice print to a plurality of stored voice prints; and in response to the first voice print not matching any of the plurality of stored voice prints, transmitting the first voice print to a surveillance system for comparison to audio data collected via a microphone of the surveillance system, wherein, in response to identifying a match between the first voice print and the audio data, image data captured via a camera of the surveillance system is tagged for redaction,
receiving a second voice call from the caller,
generating a second voice print from the second voice call,
comparing the second voice print to the plurality of stored voice prints to determine whether the caller is a first-time caller, and
in response to determining the caller is not a first-time caller, transmitting one or more attributes stored with the first voice print to the surveillance system.

15. The method of claim 14, further comprising, in response to the first voice print not matching any of the plurality of stored voice prints, storing the first voice print in the plurality of stored voice prints.

16. The system of claim 15, wherein the first voice print is stored with one or more physical attributes determined from the image data.

17. The method of claim 16, wherein the one or more physical attributes include facial features of the caller.

18. The method of claim 14, wherein the surveillance system is further configured to redact an object of interest identified in the image data.

19. The method of claim 18, wherein the surveillance system is configured to redact the object of interest identified in the image data by providing the image data to a redaction device, wherein the redaction device redacts the object of interest identified in the image data.

20. The method of claim 14, wherein the dispatch computer is further configured to determine a list of requested attributes of the caller based on a context of the second voice call.

\* \* \* \* \*